(12) United States Patent
Garcia

(10) Patent No.: US 6,688,925 B2
(45) Date of Patent: Feb. 10, 2004

(54) WIND AND WATER MOTOR

(76) Inventor: Modesto J. Garcia, 3269 Clairmont Rd. NE., Atlanta, GA (US) 30329-1017

( * ) Notice: Subject to any disclaimer, the term of this patent is extended or adjusted under 35 U.S.C. 154(b) by 0 days.

(21) Appl. No.: 09/924,077

(22) Filed: Aug. 8, 2001

(65) Prior Publication Data

US 2003/0032343 A1 Feb. 13, 2003

(51) Int. Cl.$^7$ ................................................ B63H 9/00
(52) U.S. Cl. .................................................... 440/8
(58) Field of Search ........................... 440/8, 9, 92, 93; 416/111, 117, 119, 118

(56) References Cited

U.S. PATENT DOCUMENTS

| | | | | |
|---|---|---|---|---|
| 798,372 A | * | 8/1905 | Welsh | 440/93 |
| 1,406,031 A | * | 2/1922 | Kievlan | 416/111 |
| 1,432,700 A | * | 10/1922 | Kirsten | 440/93 |
| 2,014,337 A | * | 12/1935 | Mauldin | 416/117 |
| 4,274,011 A | * | 6/1981 | Garfinkle | 440/8 |
| 4,422,825 A | * | 12/1983 | Boswell | 416/132 B |

* cited by examiner

Primary Examiner—Ed Swinehart
(74) Attorney, Agent, or Firm—Stephen J. Stark; Miller & Martin LLP

(57) ABSTRACT

This is a totally new way to harness the power of wind and running water as in rivers and ocean currents. It consist mainly of two supporting wheels mounted permanently on a main shaft. Between those two wheels are four blades, or sails, that will transfer the power of wind and running water to the main shaft to make it rotate.

Those sails will be mounted between the supporting wheels at 0, 90, 180 and 270 degrees by means of secondary shafts attached permanently to the center of them and free to rotate between the supporting wheels. Those secondary shafts will protrude through one of the supporting wheels and a sprocket wheel is attached to each of them. All four sprockets will be connected with a chain and positioned in such a way that the sail mounted at zero degrees will be in a vertical position and the one mounted at 180 degrees will be in a horizontal position. Sails mounted at 90 and 270 degrees will be at 45 degrees angle but in opposed orientation. The sails rotate inside the supporting wheels at half the speed by means of another set of chain and sprockets. One sprocket with the same number of teeth as the ones used to rotate the sails is attached permanently to a mast that supports the entire mechanism. Another sprocket with twice the number of teeth is attached permanently to one of the sails' shaft. These two sprockets are connected by a chain causing the sails to rotate at half the speed of the supporting wheels in the opposite direction. Therefor, when any of the four sails reaches the top position will be absolutely vertical facing the wind or the current of water when the entire mechanism is inverted.

12 Claims, 9 Drawing Sheets

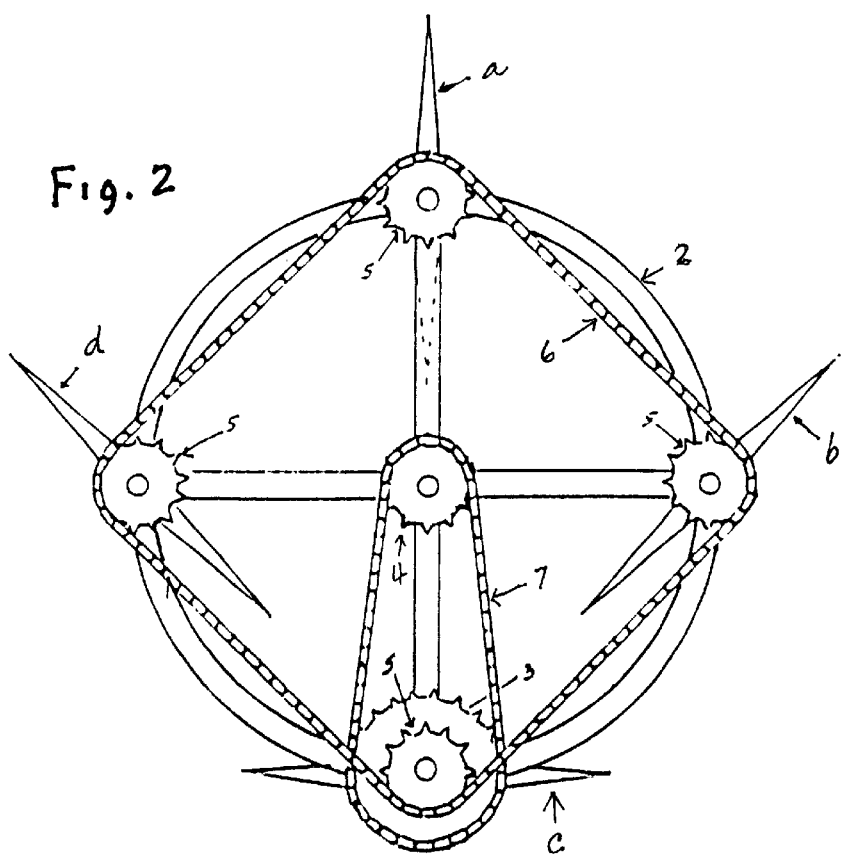
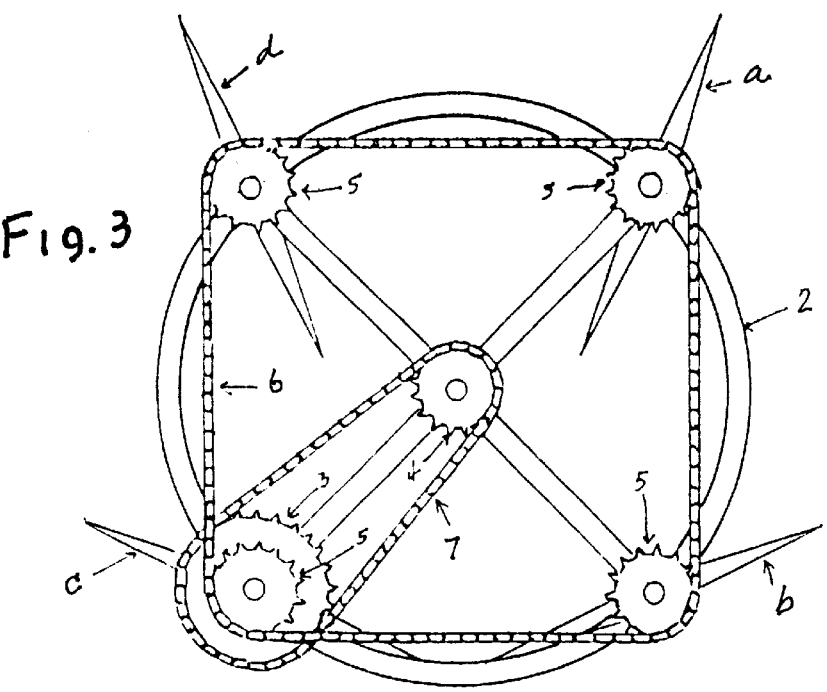

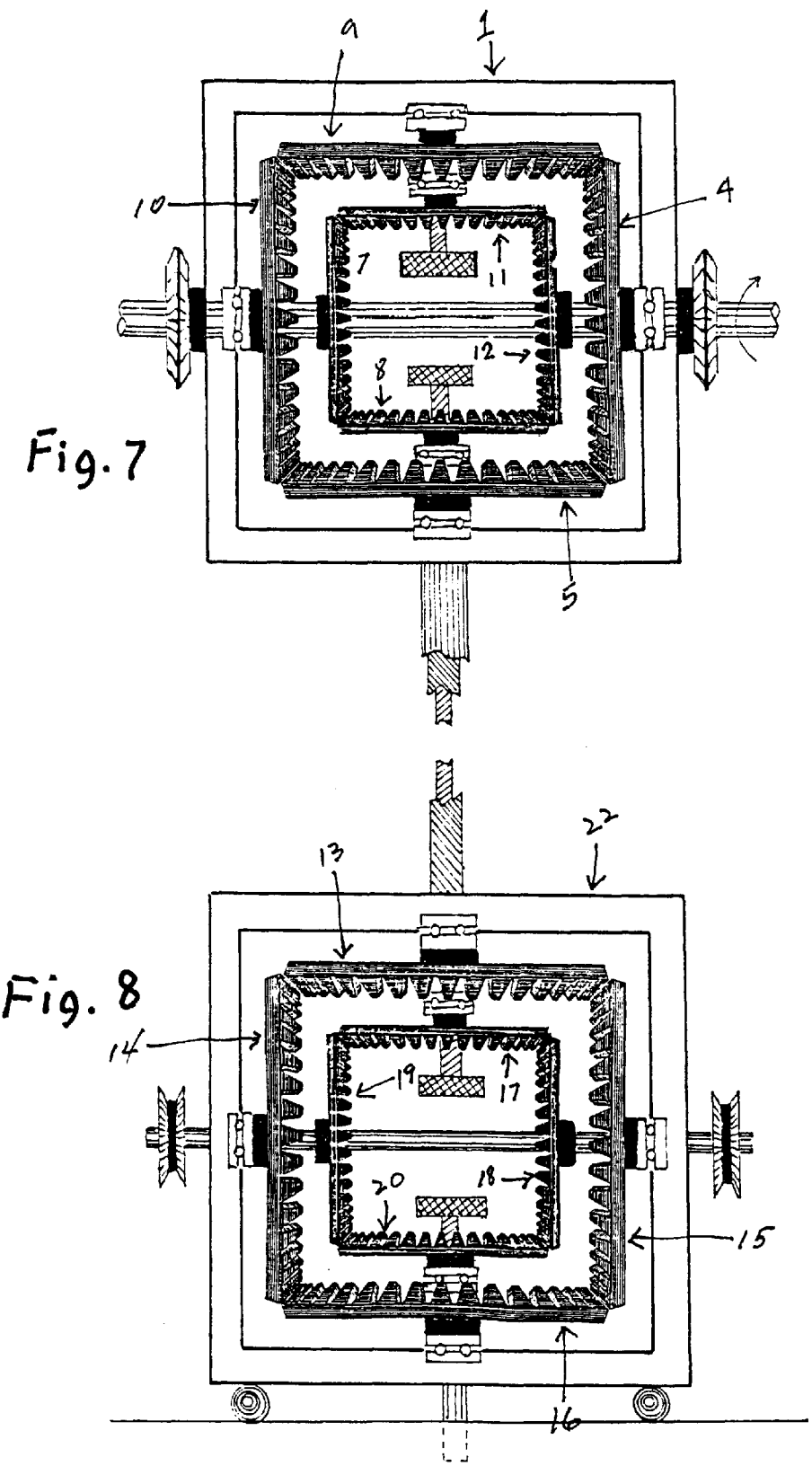

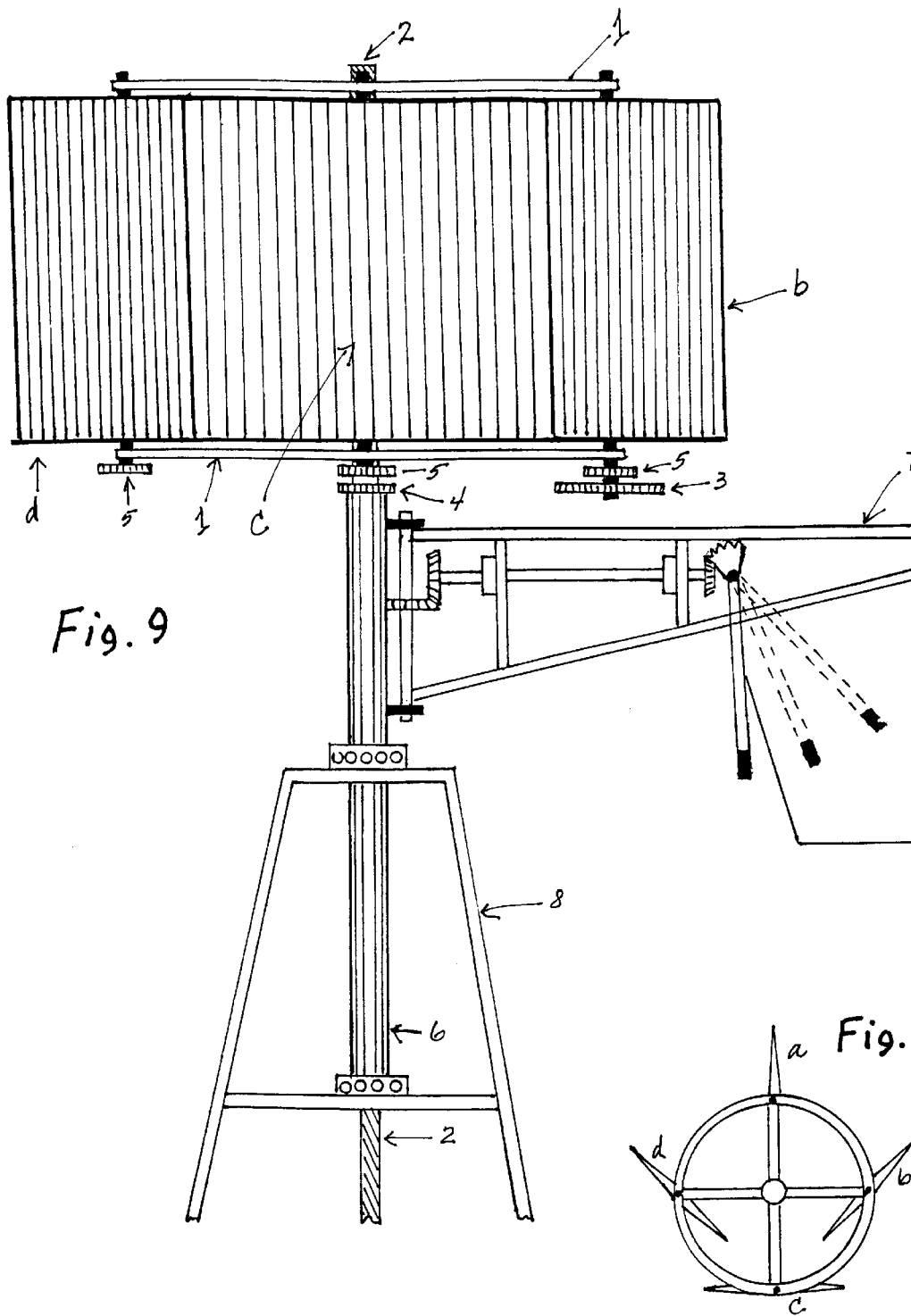

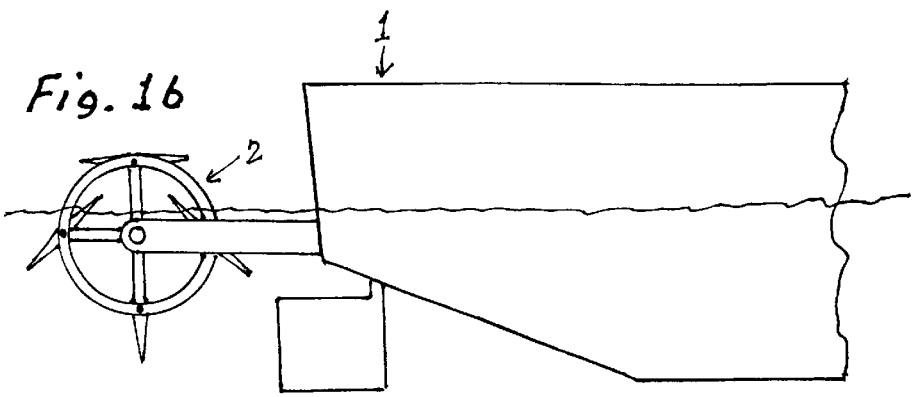
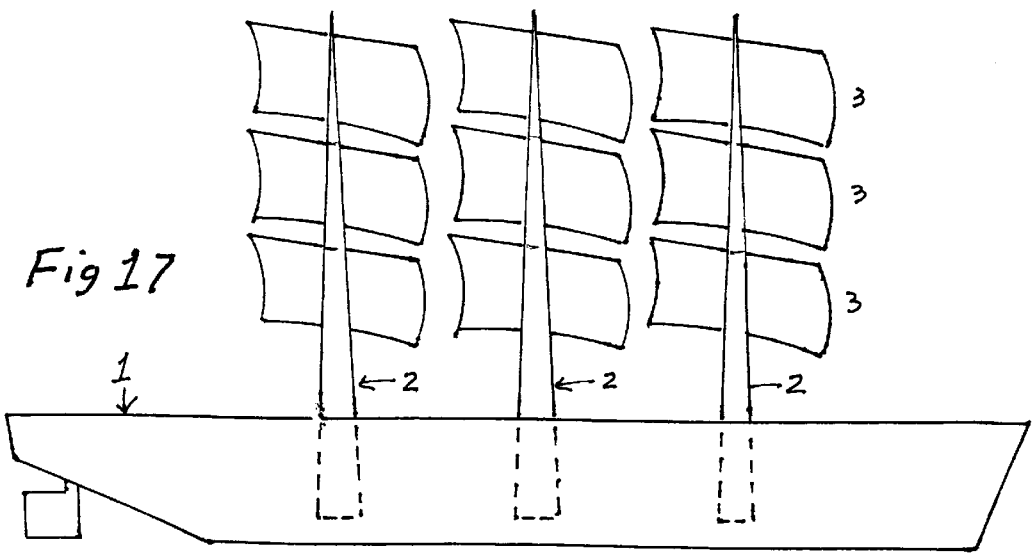
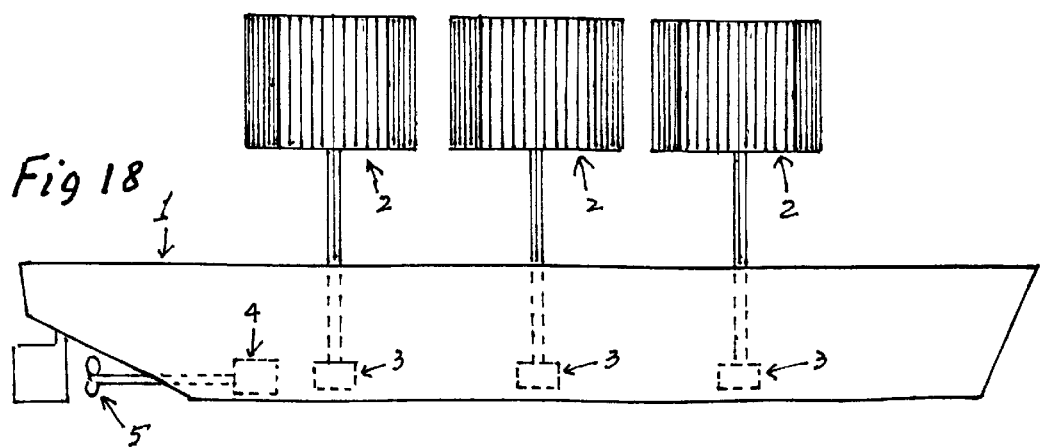

WIND AND WATER MOTOR

BACKGROUND OF THE INVENTION

1. Field of the Invention

The present invention relates to to mechanisms that utilize the force of wind or running water to produce energy to be used for the grinding of grain, produce electricity and other uses.

2. Description of Related Art

From Biblical times the force of wind has been utilized to grind grain, to pump water, and more recently to produce electricity. Also, rivers have have been dammed to create a water reservoir for many purposes, the generation of electricity one of them.

SUMMARY OF THE INVENTION

The present invention is a totally new way to harness the force of wind and of running water from streams, rivers and ocean currents mainly to produce electricity. It also can be used as a propeller for river boats and as a substitute for sails on sailing ships, now defunct because of a high cost of the crew.

BRIEF DESCRIPTION OF THE DRAWINGS

FIG. 2 is an end view of the mechanism showing how the wing are made to rotate to produce power.

FIG. 3 shows the position of the wings as the main rotor turns 45 degrees.

FIG. 7 shows the addition of four idle gears to balance the active gears.

FIG. 8 shows the addition of four idle gears to balance the active gears.

FIG. 9 Is a single rotor mounted vertically on top of a tower.

FIG. 10 is a top view of the wings position on FIG. 9.

FIG. 16 Shows the mounting of the mechanism on a river boat.

FIG. 17 Shows a three-mast sail ship.

FIG. 18 Shows a ship with three mechanisms mounted vertically.

DETAIL DESCRIPTION OF THE PREFERRED EMBODIMENTS

Reference will now be made in detail to the preferred embodiments of the invention, one or more examples of which are illustrated in the accompanying drawings. Each example is provided by way of explanation of the invention, not for limitation of the invention. In fact, it will be apparent to those skilled in the art, that modifications and variations can be made to the present invention without departing from the scope or spirit thereof.

The present invention is concerned with a mechanism entirely different from any other form that has been utilized to harness the force of wind and of running water. This mechanism is more efficient than the wind turbines that have proliferated recently on three counts: One, It needs a much smaller window of air than the current turbines. Two, The area of the current turbines that face the air is less than 10% while the area of the wings of the present invention is more than 80%, and Three, The speed of the blade tips of the current turbines is over 200 miles per hour while the speed of the current invention, in a 10 miles per hour wind is less than 10 miles per hour, therefore producing less noise and less probability of harming or killing birds. This invention can be used as a way to propel river boats instead of the big wheels now in use. Because of the small window of air that it requires, could be used to revive the sail ships in the wide oceans, since there is no need of a single crew member to handle the sails. From the ship's command bridge the Captain or First Officer, or any crew member in charge, by means of servo-motors, can orient the wind motors to face the wind. Even at anchor, or docked, the wind motors can be oriented to catch any wind to recharge the batteries.

Used in the water of fast running rivers, blocking part of the current with small and inexpensive dams it has a great potential without hurting the environment and permit the fish population to swim upstream to spawn without the need of water ladders. This invention also has a great potential in the utilization of the ocean currents as in the Gulf Stream in Florida, U.S.A. This salt water river runs from Key West to Homestead day and night, Summer or Winter 24 hours a day and thousands of this Water Motors could produce huge quantities of electricity.

Accordingly with all the above I will try to explain how it works

Figure 1:
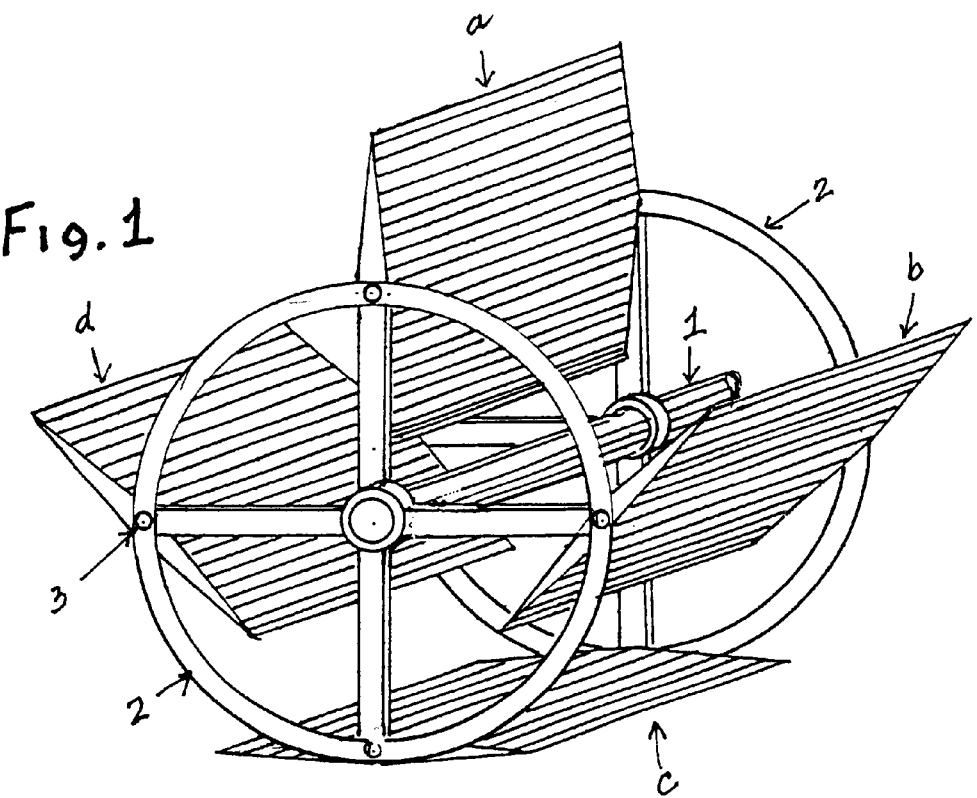
FIG. 1 is a perspective view of the basic mechanism.

FIG. 1—A perspective view of the basic parts of the movement, consisting of four blades or wings a, b, c, and d, anchored by four rods 3, between two rotating wheels 2 anchored to a drive shaft 1.

FIG. 2—A lateral view of the movement to illustrate the way it woks. The four wings a, b, c, and d,, anchored between the two wheels 2, will be made to rotate by a chain 6, that go around four sprockets 5 attached to the wings. The chain will be made to move by another sprocket 3 which is solidly attached to one of the sprockets 5. The sprocket 3 will be made to rotate by another chain 7 which goes around sprocket 4 that is attached to the vertical mast that holds the entire mechanism, and therefore totally immobile. Sprocket 3 has twice the number of teeth as sprockets 4 and 5, therefore making the wings turn at half the speed of wheel 2.

FIG. 3—Is a view from the same angle as of FIG. 2 when the rotor 2 has turned 45 degrees to the right and the wings a, b, c, and d, have turned 22.5 degrees to the left. When wheel 2 has turned another 45 degrees the wings have turned another 22.5 degrees, and therefore wing d will be in vertical position as wing a was on FIG. 2.

Figure 4:
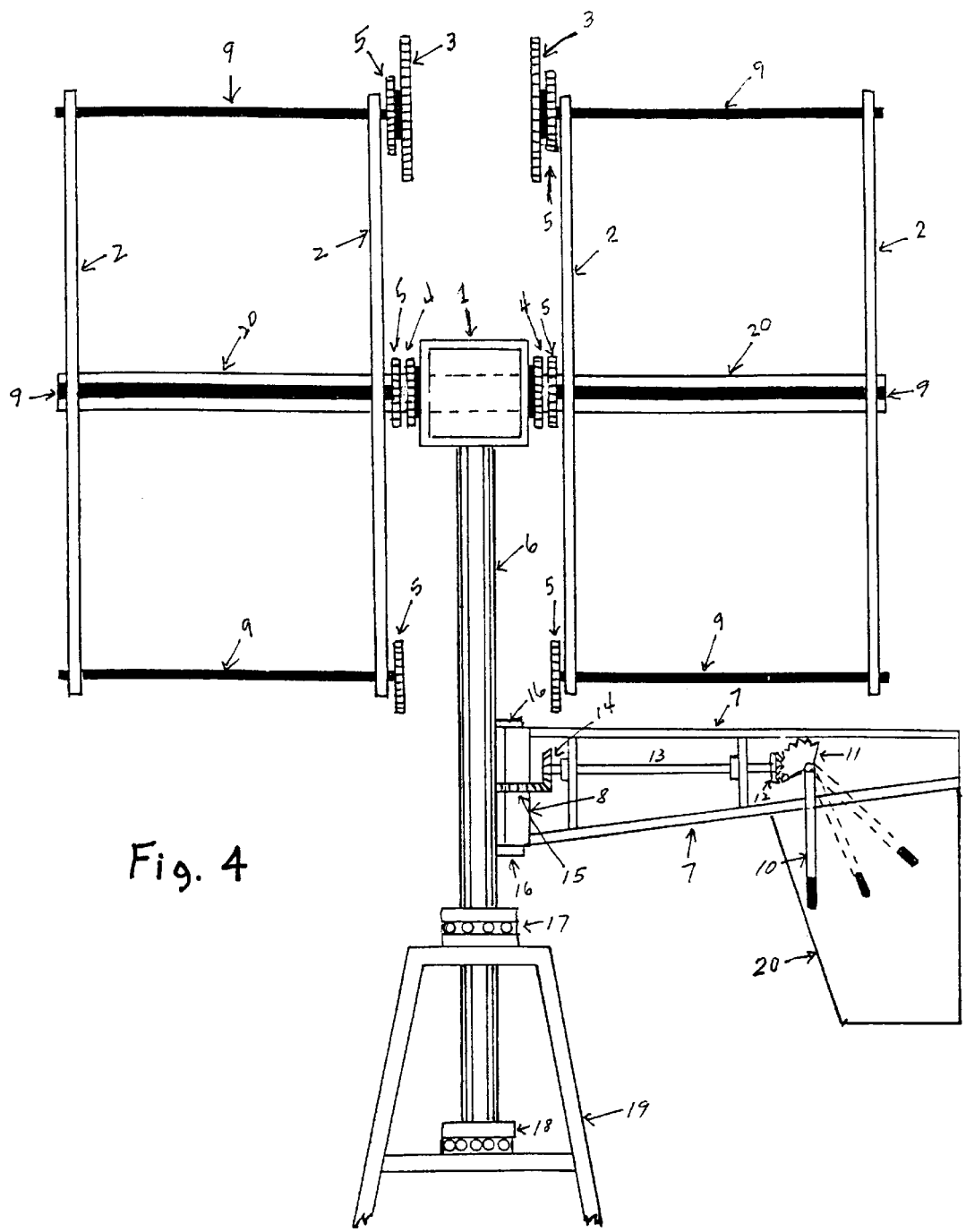
FIG. 4 shows two rotating mechanisms on a common horizontal shaft when mounted upon a tower.

FIG. 4—Shows the entire mechanism plus the wind orientation tail mounted upon a tower 19. For illustration purposes the tail is shown at the same angle of the main shaft 20. In actual set-up the tail should be mounted perpendicular to the main shaft 20.

The entire system is mounted on a main tube 6 held in vertical position upon a tower 19 by bearings 17 and 18. On top of said tube is a casing 1 that will hold a generator or a transfer case that will be explained in other figures. Through this casing there will be a main shaft 20 on which will be anchored two rotors and on them only the main wheels 2 and the wing axes 9 are illustrated. The wings have been omitted to avoid cluttering the drawing. On the rotors are seen sprockets 5 that will be driven by a chain (not illustrated) and on one of those sprockets there will be attached permanently sprocket 3 which will be connected to sprocket 4 by a chain (not illustrated). As the wind make the wheels 2 rotate sprocket 3 will be forced to rotate because the chain that connects it to sprocket 4 will have to go around it because sprocket 4 is immobile.

Below the main two rotors there is a wind orienting mechanism that will keep the rotors facing the wind and turning away from it as it increases speed to the point with winds of gale force the rotors could be 90 degrees away from it. The idea is borrowed from an airplane. The tail 20 will always be facing the wind. And the elevators, here called flaps 10 will be down when there is no wind and will move back when the wind increases. These flaps at the pivoting end has a partial bevel gear 11 that will engage another partial bevel gear 12 attached to a rod 13, which at the other end has another partial bevel 14 which will engage one more partial bevel gear 15 which is attached to the main tube 6.

Figure 5:
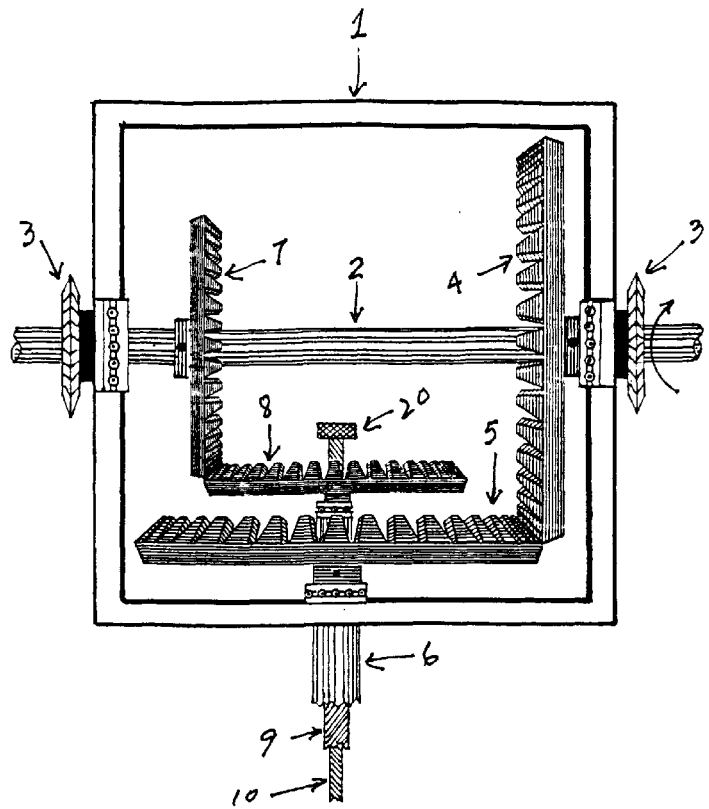
FIG. 5 is a transfer case showing the way to send the power to the ground.

FIG. 5—Shows the way to transfer the power from top of the tower down to earth by means of a set of bevel gears and counter-rotating tubes and rods. As the force is applied to the main shaft 2 bevel gear 4 attached to it will make bevel gear 5 to rotate, let's say clockwise, and this gear will be connected to a tube 9 that will take that rotation down to earth. Also inside the transfer case 1 there is another bevel gear 7 attached to the main shaft 2 that will make bevel gear 8 to rotate counter-clockwise and that gear is attached to a rod 10 that will take that rotation down to earth.

Figure 6:
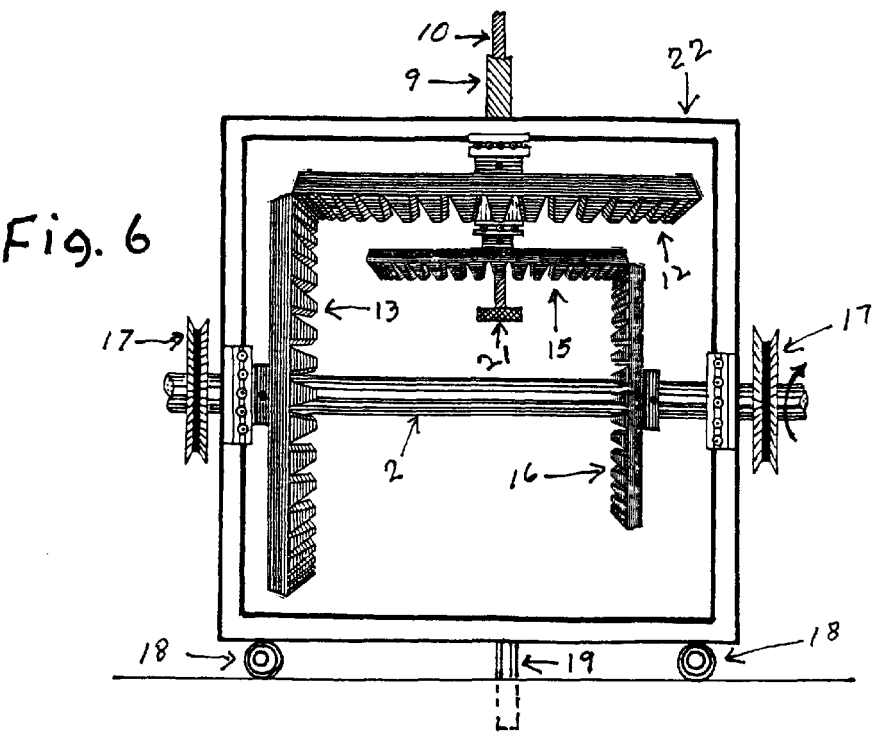
FIG. 6 is the transfer case at the ground level to receive the power of two counter-rotating shafts.

FIG. 6—This is the opposite of FIG. 5. Transfer case 22 is mounted on the ground exactly under the transfer case on top of the tower and will have to be able to turn around pivoting on pin 9 and supported by as many wheels 18 as might be needed. The counter-rotating tube 9 and rod 10 will transfer the power generated from the wind on top of the tower down to the take-off shaft 2 by means of 4 bevel gears. Tube 9 is connected to gear 12 which will attack gear 13 connected to the output shaft 2 making it move clockwise. Counter-rotating rod 10 is attached to gear 15 which will attack gear 16 making it move clockwise and is attached to the output shaft 2. Pulleys 17 are to illustrate a way to transfer power to any device like electric generators grain grinders, water pumps, etc.

FIG. 7—Same purpose as FIG. 5 with the addition of idle gears to balance the power gears. Gears 4 and 5 are acting gears while gears 9 and 10 are just there to balance the previous two. Gears 7 and 8 are acting gears and 11 and 12 are there to balance the previous two.

FIG. 8—Same purpose as FIG. 6.—Gears 13, 14, 17 and 18 are power gears while gears 15, 16, 19 and 20 are there to balance the previous four.

FIG. 9—Simplest way to utilize this invention. It consists of a single mechanism supported by a tube 6 that should be free to rotate to follow the wind. Inside that tube is the main shaft 2 that that will bring down to earth the power generated by the wind. Connected to that shaft will be the two wheels 1 that support the four wings a, b, c, and d that will be made to rotate by a chain (no illustrated) that goes around the four sprockets 5 connected to the axis or each wing. The chain will be made to move by another sprocket 3 which will be made to rotate by one more chain (not illustrated) that goes around sprocket 4 which is mounted stationary on supporting tube 6. The force of wind attacking the wings is controlled by a tail assembly 7 that has been explained before on the description of FIG. 4.

FIG. 10—This figure has been included only to show the position of the wings as shown on FIG. 9 which show only wings b, c, and d.

Figure 11:
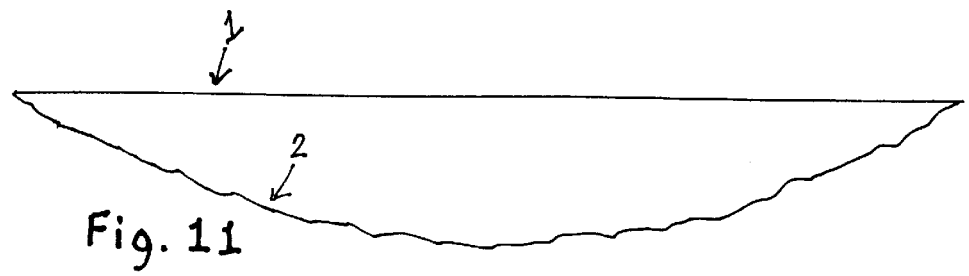
FIG. 11 is a cross section of a stream or river.

FIG. 11—Beginning with this figure we'll see to utilize this mechanism to harness the power of running water. This figure is a cross-section of a river where 1 is the surface and 2 is the bottom.

Figure 12:
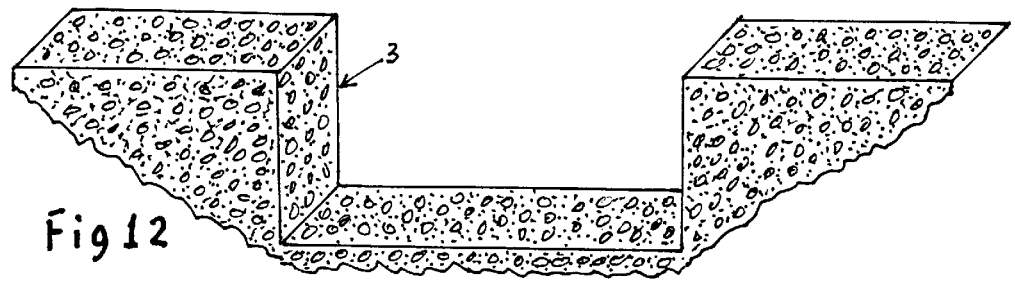
FIG. 12 of how the stream or river need to be dammed to insert the rotary

FIG. 12—Is a perspective view of the same cross-section after construction of a dam showing the opening where the mechanism will be installed.

Figure 13:
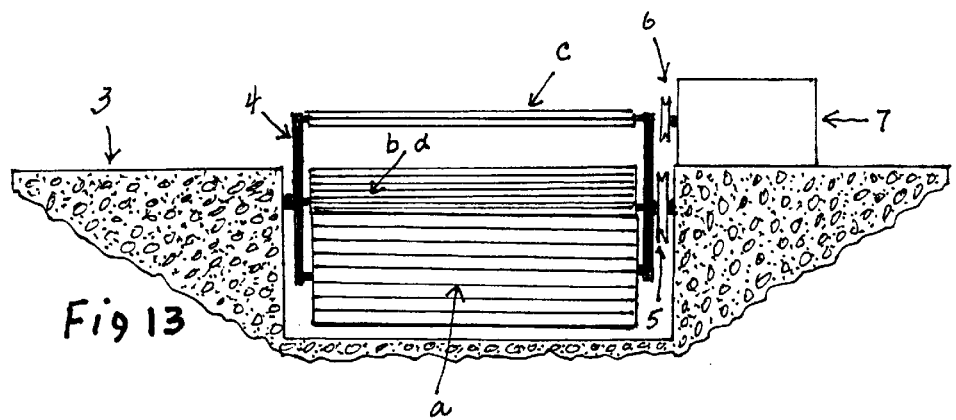
FIG. 13 show how to mount the mechanism and the electric generator.

FIG. 13—Is the same cross-section after the mechanism has been installed where 3 is the concrete dam, 4 is the mechanism showing the maximum output of power when when paddle a is in vertical position, paddle c is in a horizontal position and paddles b and d are in the water at different angles.

Figure 14:
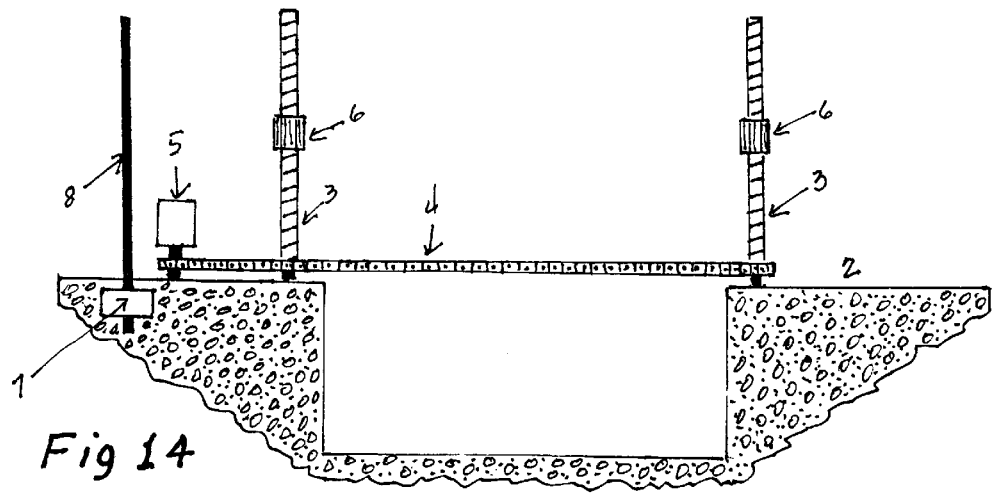
FIG. 14 Is a lateral view of a system to move the mechanism up and down as the water raises and lowers with the rains.

FIG. 14—Since the rivers volume of water changes with the seasons the entire mechanism should be mounted inside a frame (not illustrated) that should move up and down to present same face to the water. That frame should be supported by four nuts 6 running though 4 acme-threaded rods 3 that will be made to turn right or left by a chain 4 which is driven by a servo-motor 5, said servo to be controlled by a float 7 that will go up or down on a rod 8.

Figure 15:
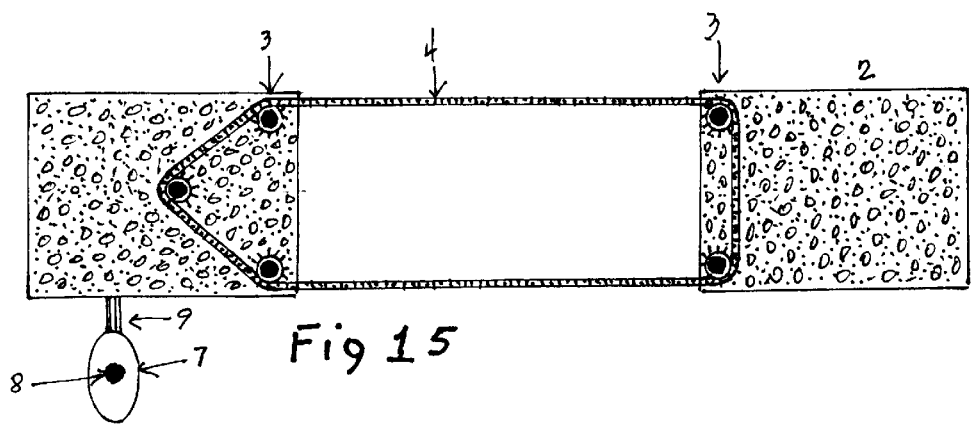
FIG. 15 is a top view of the system.

FIG. 15—Is a top view of of the system showing how chain 4 goes around the threaded rods 3 and the servo-motor by means of sprockets attached to them. It also shows how the controlling float 7 goes up and down on rod 8 which is supported by a bracket 9.

FIG. 16—Shows how to use the mechanism to propel river boats instead of the big wheels now in use.

FIG. 17—It is a sketch of a sailing ship with three masts and nine sails 3 that need a big crew to maintain the orientation of the sails.

FIG. 18—It is another sketch of the same ship with three mechanisms 2 instead of sails, with power shafts going down to the bottom of the ship to activate the generators 3 producing electricity to be stored in a bank of batteries (not shown) and an electric motor 4 to drive the propeller. There is no need for a crew to man the sails. The mechanisms can be controlled by wire (electric) from the command bridge.

While the preferred embodiments of the invention have been described above, it is to be understood that any and all equivalent realizations of the present invention are included within the scope and spirit thereof Therefor, the embodiments depicted are presented by way of example only and are not intended as limitations upon the present invention. While particular embodiments of the invention have been described and shown, it will be understood by those with ordinary skill in the art that the present invention is not limited thereto since many modifications can be made. Thus, it is contemplated that any and such embodiments are included in the present invention as may fall within the literal or equivalent scope of the appended claims.

What is claimed is:

1. A mechanism adapted to be placed in a flow of fluid comprising:
   two wheels mounted parallel on a drive shaft and separated a predetermined distance;
   four wings rotatably mounted inside the wheels, said wings mounted intermediate the wheels at zero, ninety, one hundred eighty, and two hundred seventy degrees about a circumference of the wheels, said wings respectively rotatable about wing axes through the longitudinal center of the wings;
   sprocket wheels connected to each of the wings at ends extending past one of the two wheels;
   a chain coupling the sprocket wheels together wherein when one wing moves the other three move at the same pace, wherein an angular position of any of the four wings is maintained with adjacent wings angled at forty five degrees relative to the adjacent wings, and a driven sprocket having twice as many teeth as the sprocket wheels, said drive sprocket securely connected to one of the wings, wherein when
the sprocket wheels and drive shaft rotate clockwise, the wings each rotate counter-clockwise about their respective wing axes at exactly half the speed of rotation of the sprocket wheels and drive shaft; and
a downwardly directed tube supporting the wheels and wings, said tube rotatable about a tube axis; and
a tail assembly having a tail preferential pointed toward a direction of fluid flow, and flaps operably coupled to the tube wherein as the speed of the fluid flow increases, the flaps move under the force of the fluid thereby rotating the tube about the tube axis, and thus the tube, wheels and wings up to ninety degrees from the direction of fluid flow under predetermined fluid flow speed conditions.

2. The mechanism of claim 1 wherein the drive shaft passes through a housing and then into a second mechanism where the drive shaft extends intermediate a second set of two wheels having wings mounted intermediate thereto; and said drive shaft operably coupled to an electric generator.

3. The mechanism of claim 2 with the electric generator located within the housing.

4. The mechanism of claim 2 further comprising a first shaft coupled to the drive shaft, said first shaft contained within the tube, and the drive shaft operably coupled to the first shaft.

5. The mechanism of claim 1 wherein the flaps have a fluid contacting surface which is downwardly oriented when there is no fluid flow, and said flaps pivot upwardly in an amount dependent upon the force of fluid flow against the fluid contacting surface.

6. The mechanism of claim 5 wherein the flaps are operable coupled to the tube by bevel gears and a rod such that the further the flaps are displaced by the fluid flow, the further the tube is turned.

7. The mechanism of claim 4 wherein the electric generator is connected to the first shaft.

8. The mechanism of claim 1 further comprising a first shaft contained within the tube, said first shaft coupled to the drive shaft; and
a second shaft coupled to the drive shaft to rotate oppositely to the first shaft and contained within the tube.

9. A mechanism adapted to be placed in a flow of fluid comprising:
two wheels mounted parallel on a drive shaft and separated a predetermined distance;
four wings rotatably mounted inside the wheels, said wings mounted intermediate the wheels at zero, ninety, one hundred eighty, and two hundred seventy degrees about a circumference of the wheels, said wings respectively rotatable about wing axes through the longitudinal center of the wings;
sprocket wheels connected to each of the wings at ends extending past one of the two wheels;
a chain coupling the sprocket wheels together wherein when one wing moves the other three move at the same pace;
wherein an angular position of the wings is maintained with adjacent wings angled at forty five degrees relative to each adjacent wing;
a driven sprocket having twice as many teeth as each of the sprocket wheels securely connected to one of the wings, wherein when the wheels and drive shaft rotate clockwise, the wings each rotate counter-clockwise about their respective wing axes at exactly half the speed of rotation of the wheels and drive shaft;
a tube supporting the wheels and wings;
a first shaft coupled to the drive shaft, said first shaft contained within the tube; and
a second shaft contained within the tube and first shaft and coupled to the drive shaft to rotate oppositely in direction from the first shaft.

10. The mechanism of claim 9 further comprising a tail assembly having a tail which preferential is pointed toward a direction of fluid flow and flaps operably coupled to the tube wherein as the speed of the fluid flow increases, the flaps move under the force of the fluid thereby rotating the tube, and thus the wheels and wings up to ninety degrees from the direction of fluid flow under predetermined fluid flow speed conditions.

11. The mechanism of claim 9 wherein the drive shaft is connected to a second drive shaft at a housing located intermediate the drive shafts, and further comprising gearing within the housing which oppositely rotates the first shaft relative to the second shaft upon rotation of the drive shaft.

12. The mechanism of claim 9 wherein the tube is downwardly directed.

* * * * *